June 1, 1971

J. P. TOMANY

MULTIPLE STAGE METHOD FOR REMOVING CHLORINE AND ENTRAINED ALUMINUM CHLORIDE PARTICLES FROM A WASTE GAS STREAM

Filed Dec. 27, 1968

INVENTOR:
James P. Tomany

BY: *James R. Hoatson, Jr.*
*Philip T. Liggett*
ATTORNEYS

United States Patent Office 3,582,262
Patented June 1, 1971

3,582,262
MULTIPLE STAGE METHOD FOR REMOVING CHLORINE AND ENTRAINED ALUMINUM CHLORIDE PARTICLES FROM A WASTE GAS STREAM
James P. Tomany, Darien, Conn., assignor to Universal Oil Products Company, Des Plaines, Ill.
Continuation-in-part of application Ser. No. 432,675, Feb. 15, 1965. This application Dec. 27, 1968, Ser. No. 787,485
The portion of the term of the patent subsequent to May 20, 1986, has been disclaimed
Int. Cl. B01d 47/06, 47/12
U.S. Cl. 23—2R         8 Claims

ABSTRACT OF THE DISCLOSURE

A multiple stage system for removing chlorine and aluminum chloride particles from a hot gaseous stream which embodies an initial condensation step, preferably of the nature of a centrifuging-cooling zone, so as to provide a partial cooling of the stream and effect some collection of sublimed aluminum chloride particles and then, subsequently, there is a countercurrent scrubbing of the partially cooled laden gaseous stream in the presence of at least one bed of loose mobile contact elements. A preferred operation may also incorporate a cooling-humidification stage directly ahead of the scrubbing stage.

---

This application is a continuation-in-part of my present application Ser. No. 432,675, filed Feb. 15, 1965, now Pat. No. 3,445,182.

The present invention relates to an improved multiple stage method for removing chlorine, hydrogen chloride and entrained aluminum chloride particles from a waste gas stream. More particularly, the present improved system is directed to the use of a centrifugal form of cooling zone upstream from and in combination with a liquid scrubbing treatment of a gaseous effluent stream from an aluminum smelting or purification operation which contains undesirable gaseous chlorine, hydrogen chloride and aluminum chloride particles.

In carrying out secondary aluminum purification operations, it is customary to periodically introduce gaseous chlorine into molten batches of aluminum so as to effect a degasification thereof and a removal of resulting slag-like impurities. For example, chlorine will combine with the magnesium content of the molten metal, where such metal may enter into the furnace along with aluminum scrap, to effect the formation of magnesium chloride which will in turn form a slag-like material that may be removed. However, the addition of chlorine gas to the molten metal may also form aluminum chloride which leaves the furnace in gaseous form. As the gas cools and sublimes, the aluminum chloride is converted to finely divided particulate matter which is in the size range of 0.1 to 1.0 micron so that as such material is released to the atmosphere there is a resulting dense opaque effluent. The effluent stream also contains air, HCl, chlorine, gaseous aluminum chloride and a small amount of magnesium chloride, all of which can be particularly obnoxious and damaging to the surrounding area.

Various systems have been used, or tried out, to effect the neutralization and removal of entrained particles from effluent streams of secondary smelting furnaces, as for example, the use of spray towers, packed towers, submerged inlet tanks, etc.; however, none of the previous types of systems have been entirely satisfactory. Packed bed towers are avoided as being particularly troublesome inasmuch as fixed bed packing becomes rapidly clogged with aluminum chloride fines and its efficiency impaired.

It is thus a principal object of the present invention to provide an initial cooler-condenser zone and a gas scrubbing-particle collection operation which utilizes a countercurrent type of liquid contact in the presence of mobile contact elements. Such elements when of the proper type and when utilized under proper fluidized conditions can effectively collect or agglomerate the entrained fines from an upflowing gaseous stream while at the same time permitting a down-flowing scrubbing liquid, together with a rotating and rubbing action between the multiplicity of floating elements to effect a continuous washing down of the collected material into a lower liquid collection portion of the contact unit.

It may also be considered an object of the present invention to utilize an improved system which has a centrifugal separator type of condenser zone for initially treating the gaseous stream such that it is substantially cooled and there is at least partial collection of sublimed aluminum chloride from the gaseous stream.

Still another object of the present invention is to provide a multiple stage treatment system which has an initial agglomeration-humidifying step provided by a liquid spray stream contacting the laden gas stream directly upstream from a gas-liquid contacting zone, particularly where the effluent gas stream is from an aluminum smelting furnace operation and carries much higher loadings of particulate matter than what might be considered normal. In other words, the high loadings, together with more stringent air pollution control regulations which may demand that final effluents contain aluminum chloride in concentrations as low as about 0.02 grain per cubic foot, will make it necessary to provide a multiple stage treatment system in accordance with the present invention.

Broadly, the present invention provides a multi-stage method for cooling, scrubbing and removing chlorine, hydrogen chloride and entrained aluminum chloride particles in a gaseous effluent stream from an aluminum purification operation, in a manner which comprises, initially passing said gaseous stream into a centrifuging-cooling zone and effecting an initial cooling and removal of some portion of entrained particles, subsequently passing the resulting partially cooled effluent stream upwardly through a contacting zone having at least one stage of mobile contact elements, with such stream being at a rate maintaining the elements in a loose mobile floating bed, introducing an alkaline scrubbing liquid to the upper portion of said contacting zone and effecting the continuous wetting of the surfaces of said contact elements and a resulting continuous counter-current contacting of said effluent stream by said scrubbing liquid stream while said contact elements are maintained in said mobile floating bed condition by the velocity of said gas stream, discharging a resulting scrubbed effluent stream from the upper portion of said contacting zone substantially free of chlorine, hydrogen chloride and entrained aluminum chloride particles, and withdrawing from the lower portion of said contacting zone a used scrubbing liquid stream containing absorbed and entrained components from the effluent stream.

As indicated hereinbefore, as an example, chlorine gas is periodically introduced into the mass of molten metal within an aluminum smelting furnace so as to assist in gas release and the removal of magnesium chloride slag as an impurity. The effluent from the smelting furnace has relatively high loadings of aluminum chloride particles and also is generally at a relatively high temperature above 600° F. and up to the order of 1000° to 1200° F. Thus, in accordance with the present improved system, a preferred operation utilizes the initial gas stream contact with a cooler-condenser means to effect a lowering of the gas stream temperature to below 500° F. and preferably below 400° F. so as to cause the aluminum chloride to sublime. In other words, in this initial gas treating stage, by the use of a heat exchanger or cooled form of centrifugal separator section there can be both the cooling and partial collection of aluminum chloride particulates. It is also to be noted that the use of a centrifuging-separating type of initial contacting zone will assist in the separation of other entrained particles which may carry along with the effluent gas from a smelting zone.

In a preferred scrubbing system there may be a humidification stage following the condenser stage or, i.e. directly ahead of the scrubbing zone where there are one or more gas-liquid contacting stages. The humidification section will aid in agglomerating particles and effect a still further lowering of the gaseous stream temperature.

It is also a feature of the present improved system to utilize a slightly caustic scrubbing liquid, as for example a 5% sodium hydroxide solution within the scrubbing zone. It appears that the use of the alkaline solution within the scrubber not only improves the collection efficiency, but also provides for the discharge of a neutral or slightly alkaline liquid to waste from the outlet of the scrubber zone. A sodium hydroxide solution reacts with aluminum chloride in the gaseous effluent stream to yield aluminum hydroxide in accordance with the reaction:

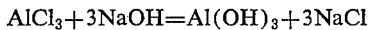

$$AlCl_3 + 3NaOH = Al(OH)_3 + 3NaCl$$

At the same time, excess chlorine and hydrogen chloride in the effluent gas stream will react with the caustic solution to produce sodium hypochlorite and sodium chloride in accordance with the reactions:

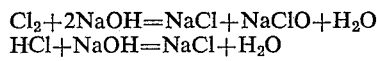

$$Cl_2 + 2NaOH = NaCl + NaClO + H_2O$$
$$HCl + NaOH = NaCl + H_2O$$

The alkalinity of the caustic solution may, of course, vary in accordance with the quantity of excess chlorine, hydrogen chloride and the quantity of aluminum chloride which is entrained in the discharge gases from the secondary smelting furnace. Generally, a 3% to about 10% caustic solution will suffice to hold the alkalinity of the scrubbing liquid to a suitable pH level above 7 and generally to about 11. The floating bed scrubbing system may be provided with a caustic solution surge tank that is arranged to receive the collected slurry from the lower portion of the scrubbing tower section whereby a continuous stream of agglomerated material may be discharged from the lower end of the surge tank and a scrubbing liquid stream recirculated from the upper portion of the tank to the spray means at the top of the contact zone for reuse in the countercurrent contacting of the gas stream over the surfaces of the contact elements. One or more stages or stacked zones that accommodate beds of contact elements may be used to effect the desired highly efficient countercurrent flow of scrubbing liquid and waste gas stream in a manner similar to that set forth in U.S. Pat. No. 3,122,594 issued to A. W. Kielback on Feb. 25, 1964. However, other forms of scrubbers may well be used and it is not intended to limit the invention to only the one form of countercurrent scrubber. In accordance with the teachings of the aforementioned patent, light weight or low density contact elements which may, for example, comprise hollow plastic spheroidal members with a dimension of approximately 1½ inches in diameter are used in each of the contact zones to provide a high surface area contact between the gas and liquid mediums. Each of the separate stages or zones may be defined by suitable perforate partitioning plate means. Thus, with a suitable adjustment of gas flow and liquid flow rates there will be the fluidization and a movement of the low density contact elements within each of the stages of the scrubber unit and channeling essentially absent. The random and rotational movements of each of the multiplicity of elements in each zone provides for the entrapment of entrained particulate material while at the same time permitting the continuous washing and removal of agglomerated particulate material from the surfaces of the spheres so that the material continuously works to a lowermost portion of the contact zone and into a liquid collection section of the scrubbing tower for discharge through a waste line or for circulation to surge tank.

The scrubber tower is, of course, of a vertically elongated construction providing for the introduction of a gaseous effluent stream into a lower part of the column below the first stage of contact elements and above the liquid collecting zone. The upper portion of the tower may be provided with suitable liquid de-entrainment means or mist extractor means such that a minimum quantity of scrubbing liquid is discharged from the upper portion of the scrubber unit to the outlet stack. In addition, and where desirable, there may be provision for introducing a bleed-in air stream below the zones containing the contact elements to compensate for variations in the amount of effluent stream flow and generally stabilize gas flow through the zones with the contact elements.

In one embodiment of the scrubbing section of the improved operating system there may be provision for the initial humidifying spray liquid to be introduced above the gas inlet to the scrubbing tower and directly below the inlet to the first stage of contact elements. However, as an alternative design and arrangement, there may be a separate humidifying chamber where water or slightly alkaline liquid stream is used to effect a humidifying agglomerating step on the gas stream prior to its introduction to the one or more zones of contact elements in the countercurrent scrubbing section.

Reference to the accompanying drawing and the following description thereof will serve to further illustrate the handling of effluent gases from an aluminum smelting furnace operation which may contain substantially large quantities of chlorine, hydrogen chloride and aluminum chloride, as well as indicate modifications in operation for effecting an efficient scrubbing system.

Figures 1, 2:
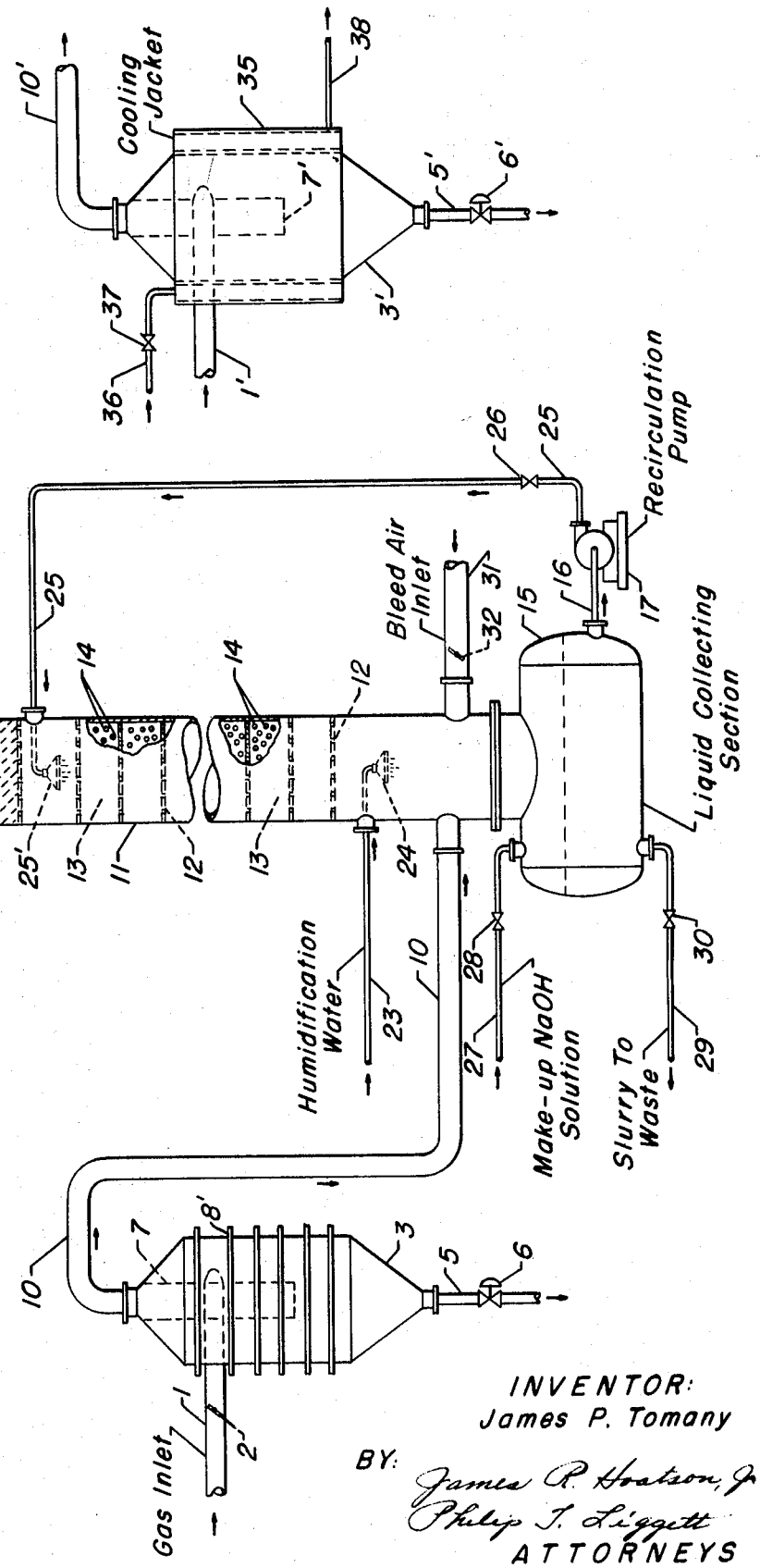
FIG. 1 of the drawing indicates in a diagrammatic elevational manner the multiple stage system.
FIG. 2 of the drawing indicates diagrammatically a modification in the design and arrangement of the initial centrifuging-cooling stage whereby there is indirect heat exchange flow for the condenser-separating section.

Referring now particularly to FIG. 1 of the drawing, there is shown a gas inlet conduit 1, with valve or damper means 2, which serves to introduce a hot gaseous stream into a cooling-condenser section 3 as a first stage of treatment. Preferably, the gaseous stream is discharged tangentially into the cylindrical form chamber of the condenser unit 3 and the latter is designed internally to be of the nature of a centrifugal separator so that entrained, or sublimed, particulates will be centrifuged out of the main gas stream and permitted to be collected and removed therefrom. Where the gaseous stream is from a degassing operation in an aluminum smelting operation so as to comprise aluminum chloride and free chlorine, hydrogen chloride along with some magnesium chloride and entrained particulates, there will be a high temperature to the incoming gas stream of the order of 750° to 1000° F. and the aluminum chloride will enter the section 3 in the gaseous state. However, with cooling there will be at least some sublimation of the $AlCl_3$ into fine particulates which can be in part separated from the main gas flow as long as there is provision to bring about separation and removal.

With the arrangement shown, the gas stream flow will swirl centrifugally around the inside of the unit 3 and centrifuge particles to the wall and lower cone section 4 whereby they may be removed by way of outlet conduit 5 and control valve means 6. The partially cleaned and partly cooled gas stream will reverse direction of flow to pass upwardly through the axial riser tube 7 and be discharged by way of transfer conduit 10. Inasmuch as it is desired to effect a cooling of the $AlCl_3$ containing gas stream prior to reaching the scrubbing stage, there may be means to improve the condensation or cooling aspect by providing for heat extraction from the exterior of the chamber 3. The present FIG. 1 indicates extended surface as a multiplicity of cooling fin means 8' extending around the exterior of the chamber so as to enhance air cooling of the entire chamber wall and, in turn, assist in cooling the internally swirling gas stream. However, as will be noted hereinafter, other heat exchange types of cooling means may well be utilized with the cooler-condenser unit 3 and it is not intended to limit the present improved operation to any one type of separation means or to any one type of cooling to provide the desired first stage cooling-condensation-separation aspects.

The partially cooled ladened gas stream from transfer conduit 10 is, in the present embodiment, introduced into the lower end portion of a vertically elongated tower 11 with a plurality of internal horizontally disposed perforated plate members 12 which in turn divide the tower into a plurality of superposed contact zones 13 for accommodating beds of contact elements 14. A multiplicity of the low density contact elements 14 are, of course, utilized in each of the separate zones 13, such that they can operate as a fluidized moving bed of elements for each of the independent zones or stages of contact. The contact elements 14 are intended to be mobile and may be hollow or perforated thin walled spheres of metal or plastic having a smooth outer surface or, alternatively, they may be of a foam-like nature formed of foamed plastics such as polyurethane, polystyrene, or the like, whereby fluidization and random movement may be effected by an upflowing gaseous stream to be scrubbed.

The lower end of tower 11 is indicated as being provided with a liquid collecting reservoir section 15 having outlet line 16 connect with pump means 17. The upper end of the tower 11 is provided with conduit or duct means 8 which in turn connects with a stack 9 having fan means 9' to maintain a constant suction on the upper portion of the tower. The gas stream inlet line 10 of course connects with the lower portion of the scrubber tower 11 at a level above the upper portion of the collection section 15 such that the gas stream may be subsequently permitted to rise upwardly through each of the contact zones 13. However, in accordance with a preferred system, there is provided a humidification liquor inlet line 23 to connect with an internal spray head 24 at a level just below the lowermost contact zone 13 such that water, or a slightly alkaline liquid stream, will effect an initial spraying and contacting of the gas inlet flow prior to the stream entering the upper contact zones 13. The spraying can assist in agglomerating the entrained fine particulates as well as provide a second stage of cooling to the stream before it reaches the one or more scrubbing sections.

At an upper level of tower 11, above the uppermost contact zone 13, there is a line 25 connective with an internal spray head 25' that serves to introduce the principal quantity of alkaline scrubbing liquid which continuously carries downwardly through each of the successive contact zones 13 countercurrently to the upward gas flow of the waste gas stream entering by way of conduit 10. In the actual operation of the unit, as hereinbefore set forth, the gas and liquid flows are adjusted such that the contact elements 4 in each of the superposed zones are caused to float above a lower perforate plate 12 and effect a random rotational floating bed action for each of the individual elements 14. There is thus insured an interphase contact between the highly laden gas stream and the liquid stream with a substantial prevention of the channeling of either stream through the unit. Each of the spaced perforate plate members 12, of course, assist in effecting a redistribution of the gas and liquid streams at each of the vertically stacked separate zones 13.

The present embodiment of FIG. 1 indicates a pump 17 connecting by line 16 to liquid collection section 15 and discharging into the line 25, having control valve 26, so as to recycle and control the flow of scrubbing liquor to the upper contact zones 13. Make-up sodium hydroxide solution is periodically, or continuously, introduced into the lower collection section 15 by way of inlet line 27 and control valve 28, so as to insure an adequate quantity and proper pH solution within the system. A waste slurry stream from the lower portion of section 15 may be discharged by way of line 29 and control valve 30. It should be noted that the pH of the scrubbing liquor shall be above 7 and preferably at the level of about 11 so as to obtain the benefit of the reactive effect between the caustic stream and the acidic aluminum chloride being agglomerated and collected.

A scrubber or contact tower of preferred design utilizes one or more mist extraction means or de-entrainment means at the upper end of the tower ahead of the discharge line such as indicated diagrammatically in the drawings as 33. Thus, a minimum quantity of liquid is permitted to be entrained and carried to the atmosphere by way of outlet conduit 8 and stack means 9.

For purposes of controlling and stabilizing gas flow through the unit, the embodiment of FIG. 1 indicates diagrammatically the use of a bleed-in air inlet duct 31 with control damper means 32 at the blower end of the scrubber tower below the first contact zone 13. Such bleed-in air stream may be controlled manually or automatically and, as indicated hereinbefore, the introduction of air shall be used primarily to compensate for fluctuations in effluent stream flow to the unit and stabilize upward flow through contact zones 13. The bleed-in air stream may also be used to assist in tempering a high temperature gas stream being introduced to the scrubber tower.

It is not intended to limit the present improved system to any one method for effecting the initial humidifying-agglomerating step, for as indicated hereinbefore, such step may be provided by spray means directly encompassed within the lower portion of the scrubbing tower or, alternatively, may be embodied within a separate humidifying chamber. The humidifying stream may be water or alternatively a specially prepared stream providing some alkalinity with the use of sodium hydroxide or other alkaline agent, whereby there may be an initial pre-neutralization step along with the humidification and agglomeration of the heavily laden gas stream prior to its entry into the superimposed contacting zones and the presence of the contact elements therein.

Also, it is not intended to limit the present invention to any one type or form of condenser or separator-cooling zone for use in the initial stage of the system. Preferably, the zone embodies a centrifugal separating section but various means may be used to effect cooling of the gas stream and at the same time provide at least partial removal of sublimed particulates. For example, a baffled chamber may be utilized to effect particle separations, as well as a centrifuging section or, alternatively, multiple small tubular centrifugal separator units may be used in one chamber.

In still another aspect, various methods of effecting cooling of the laden gas stream may be carried out in an initial stage of the system. In other words, in lieu of an air cooled type of cooled unit as indicated by 3 in FIG. 1 of the drawing, there may be definite heat exchange type cooling means provided internally, or externally, with respect to the gas stream flow in the initial condenser stage. Cooling air streams may be provided from suitable blower means and channeled to effect an efficient cooling of the high temperature gas stream. Also, liquid cooling streams may be passed in various heat exchange paths instead of using air streams to provide the desired cooling as shown diagrammatically in the accompanying drawing.

In FIG. 2 there is indicated a condenser section 3' which may be used in place of unit 3 of FIG. 1. This unit 3 is again designed to be of the nature of a centrifugal particle separating chamber with a tangential gas stream inlet 1' and a central cleaned gas outlet tube 7' connecting to a transfer conduit 10'. The lower conical section connects to a particle withdrawal line 5' with valving means 6'. The external wall portion of condenser section 3' is, in this instance, provided with a cooling jacket 35 which in turn is provided with a cooling liquid by way of line 36 with valve means 37. The cooling liquid is indicated as being discharged by way of line 38. It is to be understood that the liquid may be water or any other desired cooling medium and that the flow shown is merely for illustrative purposes. Where desired, the heat exchange arrangement may be such as to provide low temperature steam generation while at the same time effecting the desired cooling step.

As noted hereinbefore, in the case of a high temperature aluminum chloride carrying stream from a smelting furnace, it is desired to effect the initial cooling of the stream from the order of 1000° F. or more down to about 400° F., or perhaps lower, so as to provide sublimation of the $AlCl_3$ and permit some initial particle separation. Also, the lowered temperature is of particular advantage in promoting effective scrubbing within a subsequent stage of the system.

I claim as my invention:

1. A multiple stage method for removing chlorine, hydrogen chloride and entrained aluminum chloride particles from a high temperature heavily laden gaseous effluent stream containing the same, which comprises, initially passing said gaseous effluent stream into a centrifuging-cooling zone and effecting an initial cooling removal of a portion of entrained particles, subsequently passing the resulting partially cooled gaseous effluent stream upwardly through a contacting zone having at least one stage of mobile contact elements, with such stream flow being at a rate maintaining the elements in a loose mobile floating bed, introducing an alkaline scrubbing liquid to the upper portion of said contacting zone above an uppermost floating bed stage of elements and effecting the continuous wetting of their surfaces and a resulting continuous countercurrent contacting of said effluent stream by said scrubbing liquid stream while said contact elements are maintained in said mobile floating bed condition by the velocity of said gas stream, discharging a resulting scrubbed effluent stream from the upper portion of said contacting zone substantially free of chlorine, hydrogen chloride and entrained aluminum chloride particles, and withdrawing from the lower portion of said contacting zone a used scrubbing liquid stream containing absorbed and entrained components from the effluent stream.

2. The method of claim 1 further characterized in that said alkaline scrubbing liquid to the upper portion of said contacting zone comprises from about 3% to about 10% sodium hydroxide.

3. The method of claim 1 further characterized in that said initial contact of said effluent stream is contacted ahead of first stage portion of said contacting zone with a liquid spray stream to effect humidification of such stream, whereby there is an initial humidification liquid effecting agglomeration of the fine particulate matter and the enhancement of its removal in the following scrubbing stages.

4. The method of claim 1 further characterized in that there is a passing of a used scrubbing liquid stream containing absorbed chlorine hydrogen chloride and entrained aluminum chloride particles from the lowermost floating bed stage of elements to a lower confined liquid zone collection in a flow intermingled with said spray stream for humidification, a subsequent discharge of an aluminum chloride containing slurry from the lower portion of such zone and a recycling of at least a portion of the collected alkaline scrubbing liquid from an upper portion of such liquid collection zone to the upper portion of said contacting zone to provide at least a major portion of the scrubbing liquid being introduced thereto as aforesaid.

5. The method of claim 4 further characterized in that said alkaline scrubbing liquid contains sodium hydroxide.

6. The method of claim 5 further characterized in that a make-up sodium hydroxide solution is added to said lower liquid collection zone to maintain a desired alkaline liquor inventory in said system to replace scrubbing liquid losses with said slurry stream being discharged from such zone, while at the same time overcoming excessive dilution from the continuous addition of the initial humidification spray stream and the maintenance of a desired alkaline stream for said scrubbing liquid being introduced to the upper portion of said contact zone.

7. The method of claim 1 further characterized in that said centrifuging-cooling zone comprises a centrifugal separating zone having means to pass along the laden gaseous stream and also provide for the withdrawal of collected aluminum chloride particulates.

8. The method of claim 7 further characterized in that said centrifuging-cooling zone is subjected to external cooling to provide a resulting laden gaseous stream which is discharged therefrom at a temperature below about 500° F. for passage to the contacting zone.

References Cited
UNITED STATES PATENTS

| | | | |
|---|---|---|---|
| 3,445,182 | 5/1969 | Tomany | 23—2 |
| 3,494,107 | 2/1970 | Sackett | 23—2X |

EARL C. THOMAS, Primary Examiner

U.S. Cl. X.R.

23—92, 154, 219; 55—71, 72